Aug. 10, 1948.   H. W. BROWN ET AL   2,446,629
PASTRY LIFTER AND CONTAINER
Filed April 20, 1945
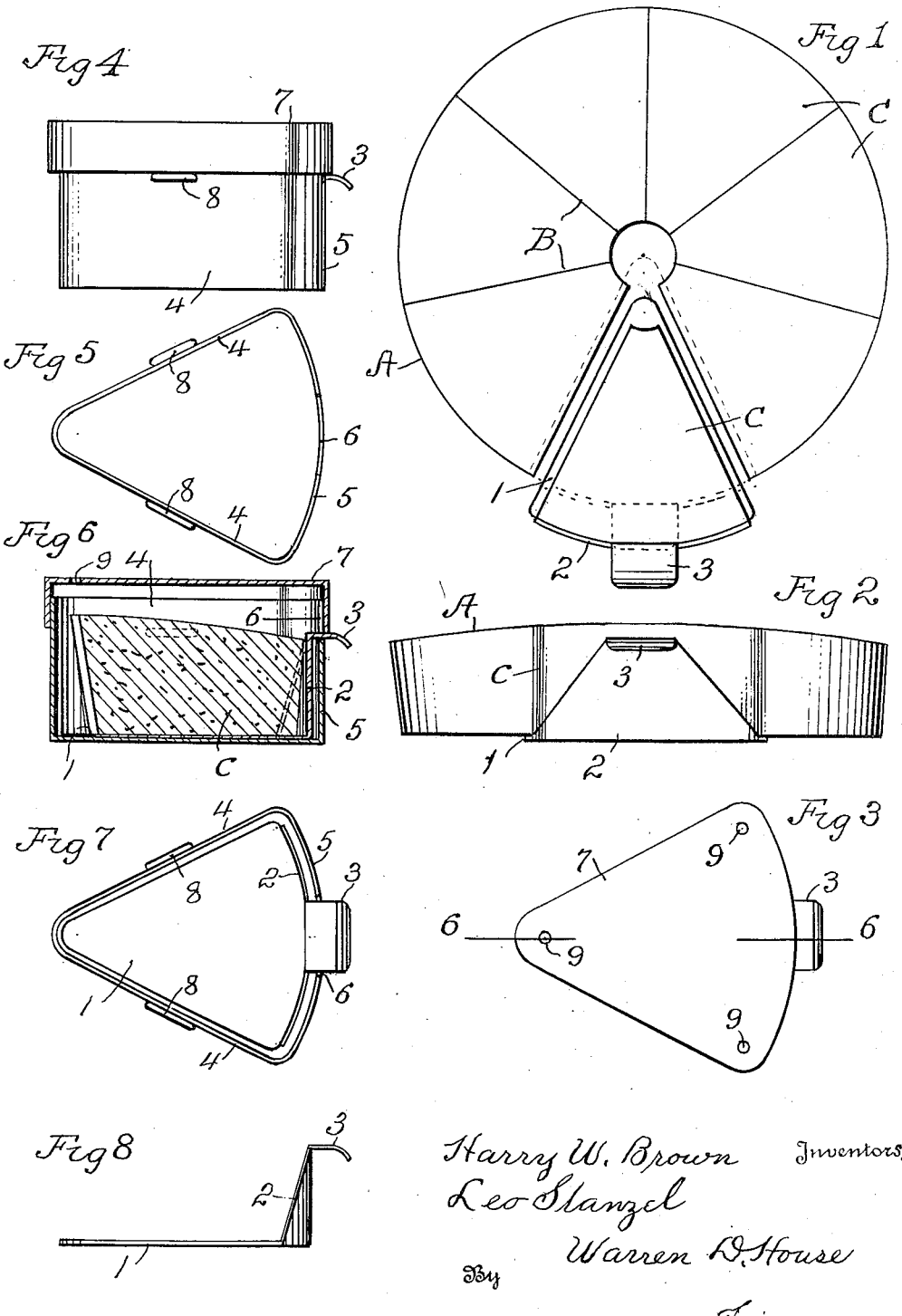

Patented Aug. 10, 1948

2,446,629

UNITED STATES PATENT OFFICE 2,446,629

PASTRY LIFTER AND CONTAINER

Harry W. Brown and Leo Stanzel, Kansas City, Mo.

Application April 20, 1945, Serial No. 589,366

2 Claims. (Cl. 206—4)

1

Our invention relates to improvements in pastry lifters and containers.

One object of our invention is the provision of a novel lifter for a piece of pastry, as pie or cake, which can be used to detach the pastry piece from the pie or cake, and then to lift, support and transport it to the place desired.

Our invention has for another object the provision of a novel pastry lifter, which is simple in structure, cheap to make, strong, durable and not likely to get out of order and which is efficient in its operation.

A further object of our invention is the provision of a novel pastry container which is adapted to receive and hold the said pastry lifter, with the piece of pastry carried thereby, and to transport and protect them from injury.

Still another object of our invention is the provision of a novel container of the kind described, which is simple, cheaply made, strong, durable, not likely to get out of order, and into which the pastry lifter with the piece of pastry thereon can easily and quickly be placed or removed therefrom, and which can be readily carried with its contents in a dinner bucket.

The novel features of our invention are hereinafter fully described and claimed.

In the accompanying drawing, which illustrates the preferred form of our invention, Fig. 1 is a plan view showing our improved pastry lifter supporting a piece of cake which the lifter has partly detached from a cake shown radially divided into a plurality of pieces ready for similar detachment.

Fig. 2 is a side elevation of what is shown in Fig. 1.

Fig. 3 is a plan view of the container, showing the finger hold of the pastry lifter protruding from under the cover.

Fig. 4 is a side elevation of what is shown in Fig. 3.

Fig. 5 is a top view of the container with the cover removed.

Fig. 6 is a section on the line 6—6 of Fig. 3, showing a piece of pastry cake, on the pastry lifter.

Fig. 7 is a plan view of the container, the cover removed, and the pastry lifter shown mounted in operative position in the container base.

Fig. 8 is a side elevation of the pastry lifter.

Similar characters of reference designate similar parts in the different views.

The pastry lifter comprises a relatively thin flat substantially triangular base 1 having forwardly converging free side edges meeting at the front end in a convex arc, the base, preferably, having a convexly arcuate form at its rear end from which rises an upstanding wall 2, concave on its front side and convex at its rear side. From the middle of the upper end of the wall 2 rearwardly extends a finger hold 3, having a downwardly curved rear end, and adapted to be gripped between the thumb and forefinger of one hand, whereby the lifter may be lifted and carried.

In operation, a pastry, as a cake, designated by A in Fig. 1, is slit, as indicated by radial lines B, Fig. 1, into a plurality of pieces C of triangular form, of less length and width than the base 1 of the lifter to be used in removing them.

In removing one of the pieces C of the cake A, the base 1 of the lifter is slipped under the piece until the outer edge of the piece C strikes the wall 2 of the lifter, then the finger hold 3 is gripped and pulled outwardly, as to the position shown in Fig. 1, at which time the finger hold is used to lift the lifter and the piece C carried thereby to transport the piece to the desired place.

For receiving the pastry lifter and the pastry carried by it, there is provided a container comprising a boxlike base, in plan view similar to but slightly larger than the base 1 of the lifter, and having side walls 4 and a rear wall 5 of height sufficient to extend above the piece of pastry C carried by the pastry lifter base 1. The container base has an open top.

The upper edge of the rear wall 5 of the container is provided at its middle with a notch 6 adapted to receive therethrough the finger hold 3 of the lifter, as shown in Fig. 6.

The pastry lifter carrying the pastry piece C is lowered into the base of the container with the finger hold 3 projecting through the notch 6, as shown in Fig. 6. The container is provided with a removable cover 7, larger than but conforming in shape to the base of the container. This cover 7 is then fitted onto the upper end of the boxlike base of the container with its rear lower edge resting on the finger hold 3 and with the lower edges of its two sides resting against the upper sides respectively of two horizontal outwardly protruding ledges 8 respectively provided in the side walls 4 of the container base, with their upper sides substantially in the horizontal plane of the bottom of the notch 6.

The container having therein the lifter and the piece of pastry may then be placed in a dinner bucket or other food transporter and conveyed to the place desired, after which, when the cover 7 is removed, the pastry lifter with the piece of pastry thereon may be lifted by the finger hold 8 from the container base.

As shown in Figs. 3 and 4, the top of the lid 7 may be provided with holes 9 to permit fresh air for ventilation.

Many modifications, within the scope of the appended claims, may be made in the pastry lifter or container without departing from the spirit of our invention.

What we claim is:

1. A container for a pastry segment comprising, a substantially triangular bottom wall, upwardly extending side walls at the edges of the bottom walls forming an open top box, one of said side walls having an elongated notch in the upper edge thereof, a pastry lifter removably mounted in said container and adapted to support a pastry segment, said lifter having a flat, thin walled base adapted to rest on the bottom wall and substantially conform to the shape thereof, an upstanding wall on the edge of the lifter base adjacent the notched wall, said upstanding wall terminating in an outwardly extending flange forming a finger hold adapted to project through the notch and rest on the notched portion of said wall, a cover removably mounted on the container for closing the open top thereof, and downwardly extending walls on said cover frictionally engaging the upstanding walls, the lower edge of the downwardly extending walls engaging the flange on the lifter for positioning the cover and holding the lifter base against vertical movement.

2. A container for a pastry segment comprising, a substantially triangular bottom wall having one arcuate edge, upstanding extending side walls at the edges of the bottom walls forming an open top box, the arcuate side wall having an elongated notch in the upper edge thereof, stop means formed in the other side walls, a pastry lifter removably mounted in said container and adapted to support a pastry segment, said lifter having a flat, thin, triangular base adapted to rest on the bottom wall with the edges of the base spaced slightly from the side walls, an upstanding wall on the edge of the lifter base adjacent the notched side wall, said upstanding wall terminating in an outwardly extending, downwardly curved flange forming a finger hold adapted to project through the notch and rest on the notched portion of said wall, a cover removably mounted on the container for closing the open top thereof, said cover having openings therein for ventilation of the container, and downwardly extending walls on said cover frictionally engaging the upstanding walls, the lower edges of the respective downwardly extending walls engaging the flange on the lifter and the stop means on the other side walls for positioning the cover and holding the lifter base against vertical movement.

HARRY W. BROWN.
LEO STANZEL.

REFERENCES CITED

The following references are of record in the file of this patent:

UNITED STATES PATENTS

| Number | Name | Date |
| --- | --- | --- |
| 1,353,689 | Wilkie | Sept. 21, 1920 |
| 1,612,367 | Fulton | Dec. 28, 1926 |
| 1,728,211 | McClellan | Sept. 17, 1929 |
| 1,746,614 | Sibbald | Feb. 11, 1930 |
| 1,814,785 | Broadwell | July 14, 1931 |
| 1,848,120 | Fisher | Mar. 8, 1932 |
| 1,927,435 | Derst | Sept. 19, 1933 |
| 1,939,342 | Edwards | Dec. 12, 1933 |